(12) United States Patent
Zhou

(10) Patent No.: US 10,095,416 B2
(45) Date of Patent: Oct. 9, 2018

(54) STORAGE OPTIMIZATION BASED ON APPLICATION FEEDBACK

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/277,192

(22) Filed: Sep. 27, 2016

(65) Prior Publication Data

US 2018/0088803 A1 Mar. 29, 2018

(51) Int. Cl.
G06F 3/06 (2006.01)

(52) U.S. Cl.
CPC ............ G06F 3/061 (2013.01); G06F 3/067 (2013.01); G06F 3/0629 (2013.01); G06F 3/0647 (2013.01); G06F 3/0659 (2013.01)

(58) Field of Classification Search
CPC ....... G06F 3/0647; G06F 3/061; G06F 3/0685
See application file for complete search history.

(56) References Cited

U.S. PATENT DOCUMENTS

| 8,443,163 | B1 | 5/2013 | Bailey et al. |
| 8,473,566 | B1 * | 6/2013 | Cardente ................. G06F 3/061 370/252 |
| 8,707,308 | B1 | 4/2014 | Naamad et al. |
| 8,745,327 | B1 | 6/2014 | Throop et al. |
| 9,063,861 | B1 | 6/2015 | Derbeko et al. |
| 9,274,941 | B1 | 3/2016 | Throop et al. |
| 2015/0039826 | A1 | 2/2015 | Burton et al. |
| 2016/0077886 | A1 | 3/2016 | Kramer |
| 2016/0357443 | A1 * | 12/2016 | Li ........................... G06F 3/065 |

FOREIGN PATENT DOCUMENTS

CN 103106047 A 5/2013

OTHER PUBLICATIONS

Mellor, Chris, "EMC delivers sub-volume tiering to mid-range," The Resister, http://www.theregister.co.uk/2010/05/11/emc_fast_2/, May 11, 2010.
Yalamanchili, et al., "Discriminating Hierarchical Storage," Proceedings of the Israeli Experimental Systems Conference, Apr. 2012.

* cited by examiner

*Primary Examiner* — Edward J Dudek, Jr.
(74) *Attorney, Agent, or Firm* — Nelson and Nelson; Daniel P. Nelson; Alexis V. Nelson

(57) ABSTRACT

A method for optimizing data storage based on application feedback includes receiving, by a storage system from an application, an I/O request associated with particular data residing on the storage system. The storage system processes the I/O request and returns a response to the application. The application analyzes the I/O and sends feedback to the storage system indicating whether I/O performance associated with the I/O request was acceptable. In the event the I/O performance was not acceptable, the storage system automatically adjusts an algorithm for placing the particular data on storage tiers of the storage system. This may include, for example, adjusting a decision window over which I/O activity to the particular data is measured, adjusting a weight of the particular data, adjusting a priority of the particular data within a migration queue, or the like. A corresponding system and computer program product are also disclosed.

20 Claims, 8 Drawing Sheets

|  | $D_0$ | $D_1$ | $D_2$ | $D_3$ |
|---|---|---|---|---|
| Raw EMA | 4 | 7 | 6 | 9 |
| Weight | 3 | 1 | 1 | 1 |
| Final EMA | 12 | 7 | 6 | 9 |

Fig. 8

STORAGE OPTIMIZATION BASED ON APPLICATION FEEDBACK

BACKGROUND

Field of the Invention

This invention relates to systems and methods for optimizing storage of data in response to application feedback.

Background of the Invention

In today's tiered storage architectures, the "hotness" or "coldness" of data may be continually monitored so that it can be optimally placed on storage media. For example, "hot" (i.e., frequently accessed) data may be placed on faster, more expensive storage media (e.g., solid state drives) to improve I/O performance. "Cold" (i.e., less frequently accessed) data may be placed on slower, less expensive storage media (e.g., hard disk drives) with reduced I/O performance. As the temperature of the data changes, the data may be migrated between storage tiers to optimize I/O performance.

In tiered storage architectures, determining when to migrate data as well as what data to migrate is a significant issue. Some tiered storage architectures may promote data elements to higher performance storage media without any knowledge of how the data elements relate to logical storage resources, such as files, data sets, and/or logical volumes. This may result in part of a file, data set, or logical volume being migrated instead of the entire file, data set, or logical volume.

The timing associated with migrating data may also be an important issue, since it may significantly affect I/O performance. In some cases, migrating data to higher performance storage media when the data is in high demand may significantly reduce I/O performance and throughput during the migration. Migrating data at inopportune times may be self-defeating as the goal of the migration may be that of ultimately improving I/O performance.

In view of the foregoing, what are needed are systems and methods to more optimally migrate data in tiered storage architectures. Ideally, such systems and methods will improve I/O performance and throughput by more optimally addressing when to migrate data and what data to migrate.

SUMMARY

The invention has been developed in response to the present state of the art and, in particular, in response to the problems and needs in the art that have not yet been fully solved by currently available systems and methods. Accordingly, systems and methods are disclosed to optimize data storage based on application feedback. The features and advantages of the invention will become more fully apparent from the following description and appended claims, or may be learned by practice of the invention as set forth hereinafter.

Consistent with the foregoing, a method for optimizing data storage based on application feedback is disclosed. In one embodiment, such a method includes receiving, by a storage system from an application, an I/O request associated with particular data residing on the storage system. The storage system processes the I/O request and returns a response to the application. The application analyzes the I/O and sends feedback to the storage system indicating whether I/O performance associated with the I/O request was acceptable. In the event the I/O performance was not acceptable, the storage system automatically adjusts an algorithm for placing the particular data on storage tiers of the storage system. This may include, for example, adjusting a decision window over which I/O activity to the particular data is measured, adjusting a weight of the particular data, adjusting a priority of the particular data within a migration queue, or the like.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 8 is a table showing how weights may be applied to particular data to improve its I/O performance.

DETAILED DESCRIPTION

Figure 1:
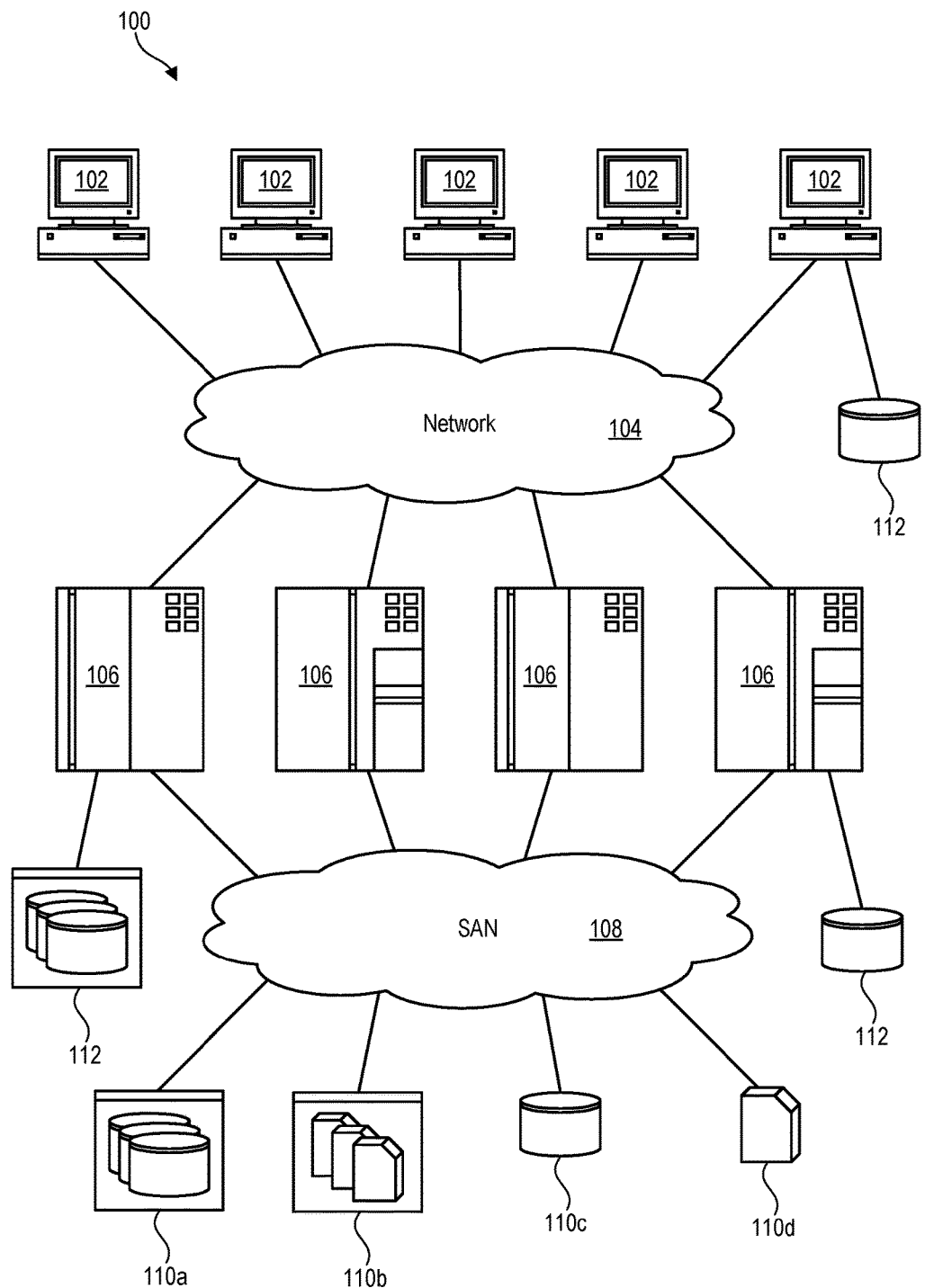
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
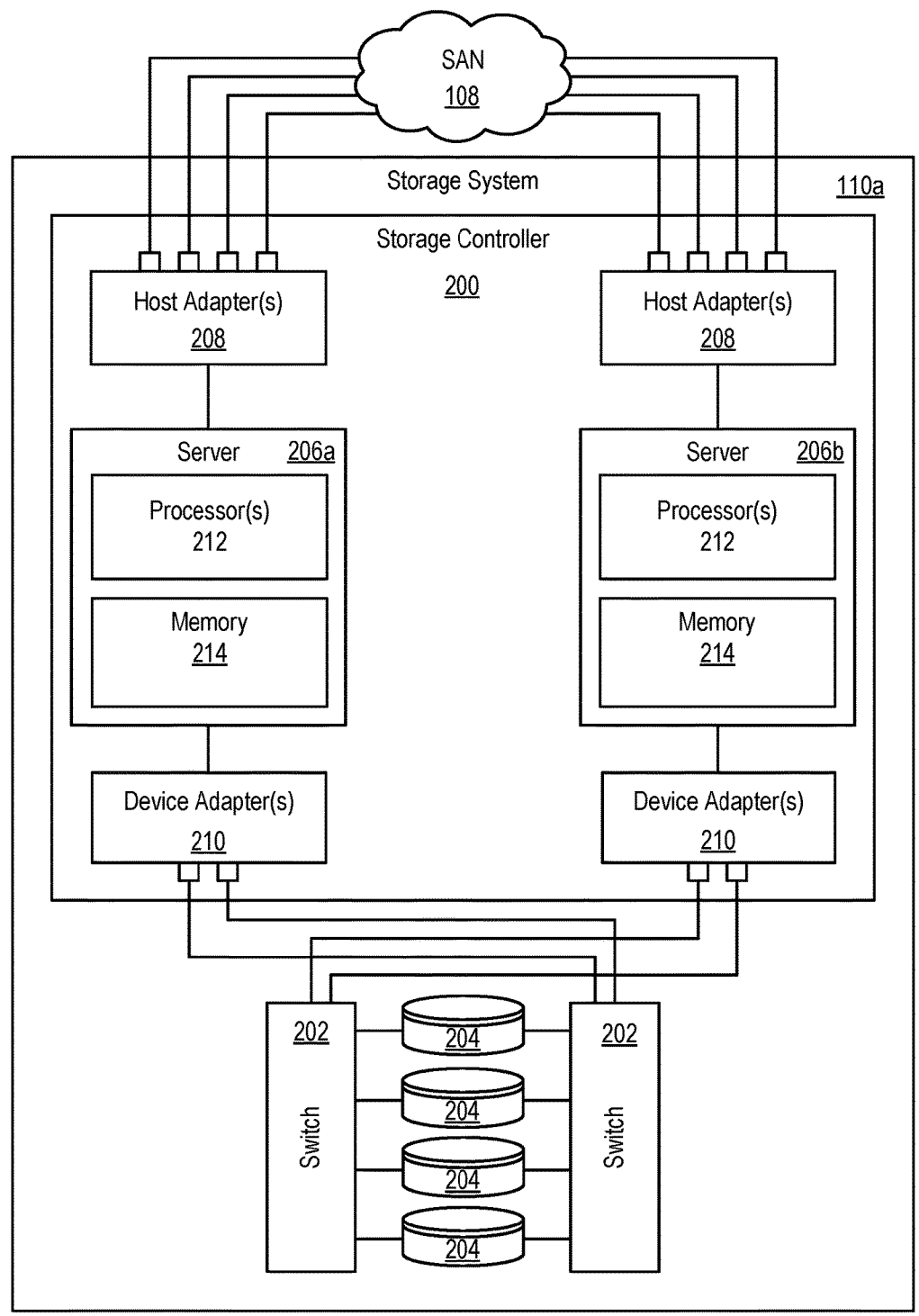
FIG. 2 is a high-level block diagram showing an example of a storage system that may contain various storage tiers of differing performance.

Referring to FIG. 2, one embodiment of a storage system 110a containing an array of hard-disk drives 204 and/or solid-state drives 204 is illustrated. The internal components of the storage system 110a are shown since certain functionality in accordance with the invention may be implemented within such a storage system 110a. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

Figure 3:
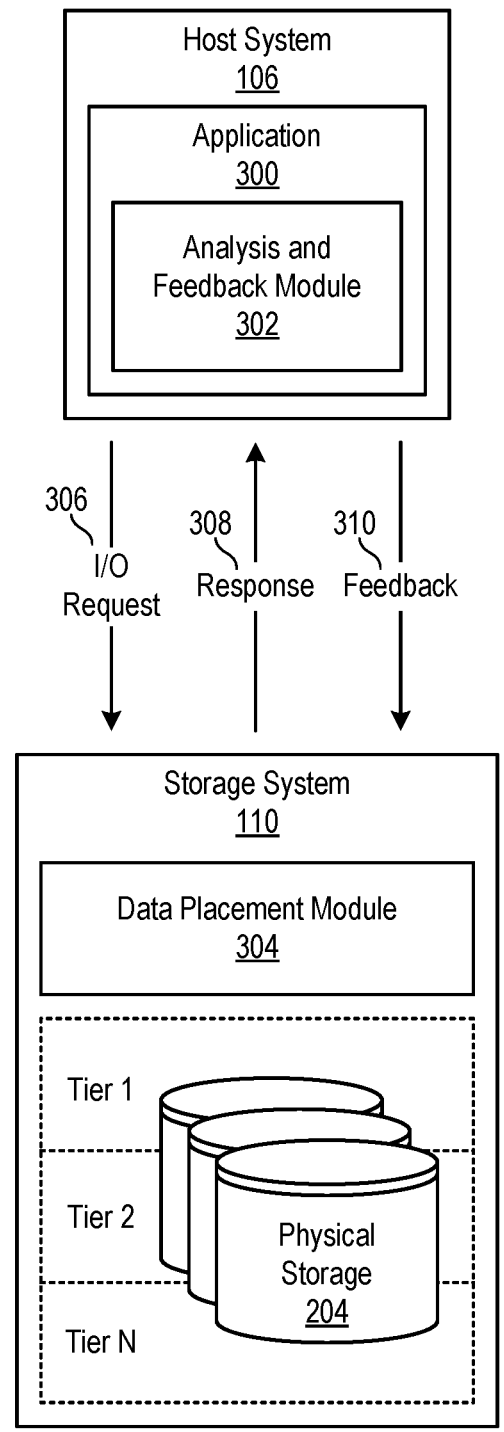
FIG. 3 is a high-level block diagram showing communication between a host system and a storage system, as well as modules within each of the host system and storage system.

Referring to FIG. 3, in certain cases, a storage system 110 such as that illustrated in FIG. 2 may provide various tiers of storage providing different levels of I/O performance. For example, solid state drives 204 may be organized into a first storage tier, higher-performing hard disk drives 204 may be organized into a second storage tier, lower-performing hard disk drives 204 may be organized into a third storage tier, and so forth. A data placement module 304 on the storage system 110 may move data between the storage tiers. For example, hotter data (i.e., more frequently accessed data) may be moved to higher performing storage tiers while colder data (i.e., less frequently accessed data) may be moved to lower performing storage tiers. As the temperature of the data changes, the data may be moved between storage tiers. In certain embodiments, movement of data between storage tiers may be hidden from a host system 106 and/or application 300 running on a host system 106.

In certain cases, despite movement of data between storage tiers, I/O performance for a particular piece or element of data may not live up to an application's expectations or requirements. Conventionally, two different options may be used to enable data to be placed on an appropriate storage tier. As alluded to above, the first option is to hide most or all data movement functionality from upper layer applications 300 and enable data placement functionality on the storage system 110 to decide where data is stored and when to move data between storage tiers. The second option is for the storage system 110 to expose an application programming interface (API) to enable the applications 300 to control how data is stored and moved within the storage system 110.

Each option provides various disadvantages. For example, the first option prevents an application 300 from controlling or otherwise affecting the placement of data on underlying storage tiers, even if I/O performance associated with the data is not living up to the application's expectations/requirements. The first option also makes it is difficult if not impossible to provide a data placement algorithm that works well for all applications 300 since each application 300 may have different workload characteristics. The second option, although providing additional control, introduces significantly more complexity into the application 300. In many cases, the application 300 may have little if any knowledge of its workload and thus be ill-equipped to determine how its data should be stored or moved within a tiered storage system.

In view of the foregoing, systems and methods are needed to enable an application 300 to have some control over how data is stored and moved within a tiered storage system, without adding significant complexity to the application 300. For example, systems and methods in accordance with the invention may expose a simple API that enables an application 300 to indicate the acceptability/unacceptability of I/O performance associated with particular data. In other words, systems and methods in accordance with the invention may enable an application 300 to indicate, to a storage system 110, whether I/O performance associated with particular data did or did not meet its expectation/requirements. Based on this feedback, the storage system 110, and more particularly a data placement module 304 within the storage system 110, may adjust its algorithm for placing and moving data within the storage tiers. Ideally, this will cause the application's expectations and/or requirements to be met.

In order to implement such a system and method, one or more modules may be implemented in a host system 106 (or application 300 in the host system 106) and storage system 110. As shown, the application 300 may include an analysis and feedback module 302 in accordance with the invention, and the storage system 110 may include a data placement module 304 in accordance with the invention. In general, when an I/O request 306 (e.g., read, write, etc.) is received by the storage system 110 from an application 300, the storage system 110 may process the I/O request and return a response 308 to the application 300. The analysis and feedback module 302 within the application 300 may then analyze the completed I/O to determine whether its expectations/requirements were met (e.g., whether the I/O request 306 was completed in an acceptable amount of time). If not met, the analysis and feedback module 302 may return feedback 310 (also referred to herein as a hint 310) that indicates whether the I/O did or did not meet the application's expectations/requirements. If the I/O did not meet the application's expectations/requirements, the data placement module 304 may adjust the algorithm it uses to place and move data on the tiered storage. This process may be iterative in that the data placement module 304 may continually adjust its algorithm in response to feedback 310 from the application 300, ideally optimizing the algorithm in a way that will meet the application's expectations/requirements.

Figure 4A:
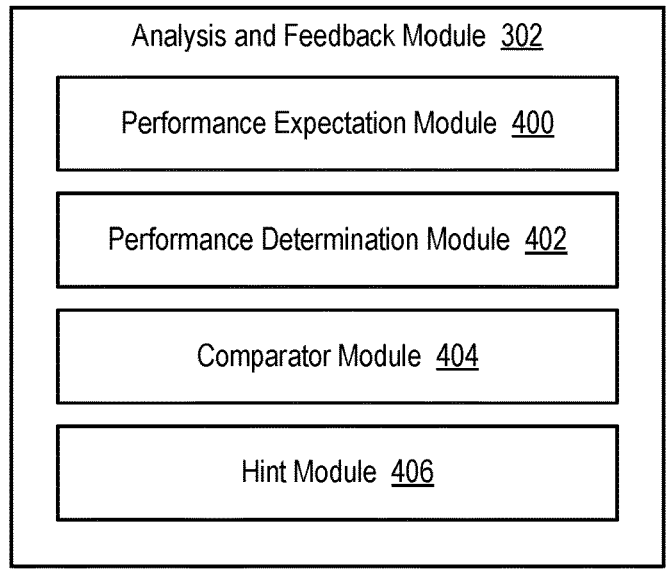
FIG. 4A is a high-level block diagram showing various sub-modules that may be included in an analysis and feedback module in accordance with the invention.
Figure 4B:
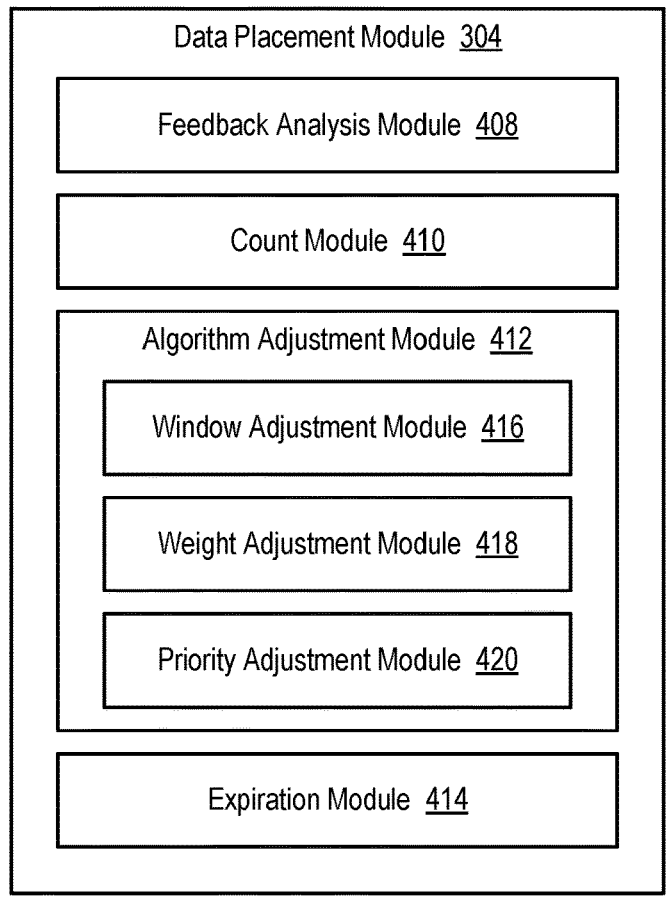
FIG. 4B is a high-level block diagram showing various sub-modules that may be included in a data placement module in accordance with the invention.

Referring to FIGS. 4A and 4B, the analysis and feedback module 302 and data placement module 304 introduced in FIG. 3 may include various sub-modules to provide various features and functions. These modules and associated sub-modules may be implemented in hardware, software, firmware, or combinations thereof. For example, the analysis and feedback module 302 may include one or more of a performance expectation module 400, performance determination module 402, comparator module 404, and hint module 406. Similarly, the data placement module 304 may include one or more of a feedback analysis module 408, count module 410, algorithm adjustment module 412, and expiration module 414. The algorithm adjustment module 412 may include one or more of a window adjustment module 416, weight adjustment module 418, and priority adjustment module 420. These sub-modules are presented by way of example and are not intended to represent an exhaustive list of sub-modules that may be included within the associated modules 302, 304. The modules 302, 304 may include more or fewer sub-modules than those illustrated, or the functionality of the sub-modules may be organized differently.

Within the analysis and feedback module 302, the performance expectation module 400 may determine an expected and/or required I/O performance associated with a particular piece or element of data. In certain embodiments, this I/O performance may be expressed or quantified as an amount of time, an amount of time within a selected time period (such as a peak operating period or a period of high demand), an amount of time after accounting for any other non-storage-system-related delays, and or the like. This expected or required I/O performance may be calculated before or while an I/O is processed by the storage system 110, or after the a response to the I/O is received. In contrast, the performance determination module 402 may determine actual I/O performance associated with an I/O, such as an amount of time it took for the I/O to be processed or an amount of time it took for data or a completion status to be returned back to the application 300 in response to an I/O.

Once the expected I/O performance and the actual I/O performance are determined, the comparator module 404 may compare the two. If the actual I/O performance does not match the expected I/O performance, the hint module 406 may return feedback 310 to the storage system 110 that indicates that the response time did not meet expectations. If the actual I/O performance did match the expected I/O performance, the hint module 406 may not provide feedback 310 or respond with feedback 310 that indicates that I/O performance was acceptable. In certain embodiments, the feedback 310 includes information indicating the amount the I/O was unacceptable. For example, if actual I/O performance fell short of expected I/O performance by 2 milliseconds, this information may be included in the feedback 310 so that the data placement module 304 may adjust its algorithm accordingly. The feedback 310 may also, in certain embodiments, include information identifying the data for which the I/O performance was not acceptable.

At the storage system 110, the feedback analysis module 408 within the data placement module 304 may receive and analyze the feedback 310. For example, the feedback analysis module 408 may determine whether an I/O response time was acceptable to the application 300. In certain embodiments, the count module 410 may count a number of times the I/O response time was unacceptable for a particular data piece of element. This may allow the algorithm to be adjusted each time an I/O response time is deemed to be unacceptable, or after the I/O response time has been deemed unacceptable a certain number of times.

In response to an I/O (or set of I/Os if a count is used) not meeting an application's expectations, the algorithm adjustment module 412 may adjust the algorithm used by the data placement module 304 to store and/or move data within the tiered storage system. Various mechanisms may be used to adjust this algorithm. For example, the window adjustment module 416 may adjust a decision window over which the hotness/coldness of data is calculated. In some cases, use of a shorter decision window may increase the heat of data over certain time periods, thereby causing it to be migrated to a higher storage tier. Shortening a decision window may be appropriate in situations where I/O or IOPs to data changes relatively quickly and longer windows may not adequately detect these changes and enable the temperature of the data to change accordingly.

The weight adjustment module 418 may adjust the weight of particular data. In certain embodiments, increasing the weight of data may be accomplished by multiplying I/O to the data by a selected multiplier. For example, each I/O to certain data may be multiplied by five so that it carries the same weight as five I/Os to other data. Other techniques for giving more weight to data may be used and are within the scope of the invention.

The priority adjustment module 420 may adjust the priority of data within a migration queue. For example, I/O response times may be longer than expected if particular data cannot be migrated to a higher storage tier by the time it is needed. In certain cases, the data may wait in a queue to be migrated. If this data could be pushed forward in the queue or given additional priority, the data may be migrated earlier to improve I/O response times. The priority adjustment module 420 may be configured to adjust such priorities to improve I/O performance.

In certain embodiments, each of the adjustments made by the algorithm adjustment module 412 may have a limited life or durability to ensure that the algorithm is not changed permanently and/or into perpetuity. The expiration module 414 may, in certain embodiments, cause these adjustments to become invalid or revert back to a default configuration after a certain amount of time.

Figure 5:
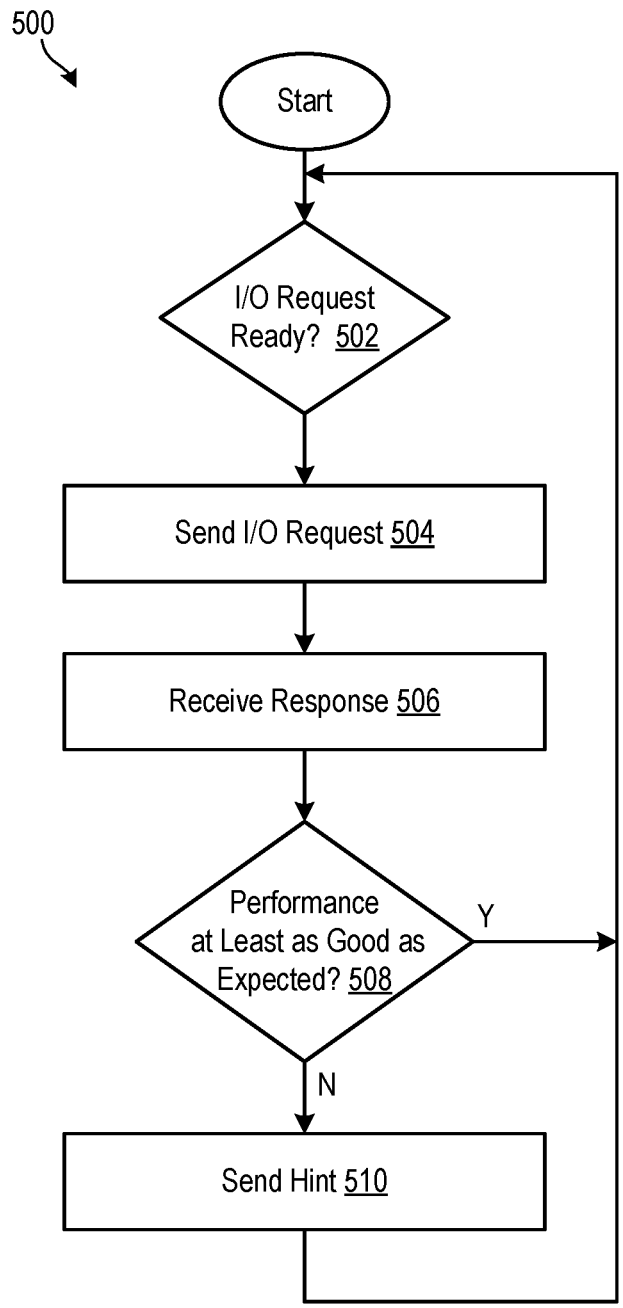
FIG. 5 is a process flow diagram showing one embodiment of a method that may be implemented at a host system.

Referring to FIG. 5, one embodiment of a method 500 that may be implemented at the host system 106 or an application 300 on the host system 106 is illustrated. As shown, the host system 106 or application 300 initially determines 502 whether an I/O request is ready to be sent. If so, the host system 106 or application 300 sends 504 the I/O request 306 to the storage system 110 and waits for a response. Upon receiving 506 the response, the host system 106 or application 300 determines 508 whether the actual I/O performance of the I/O met or exceeded the expected I/O performance. If not, the host system 106 or application 300 sends 510 a hint 310 to the storage system 110 indicating that the I/O performance was not acceptable.

Figure 6:
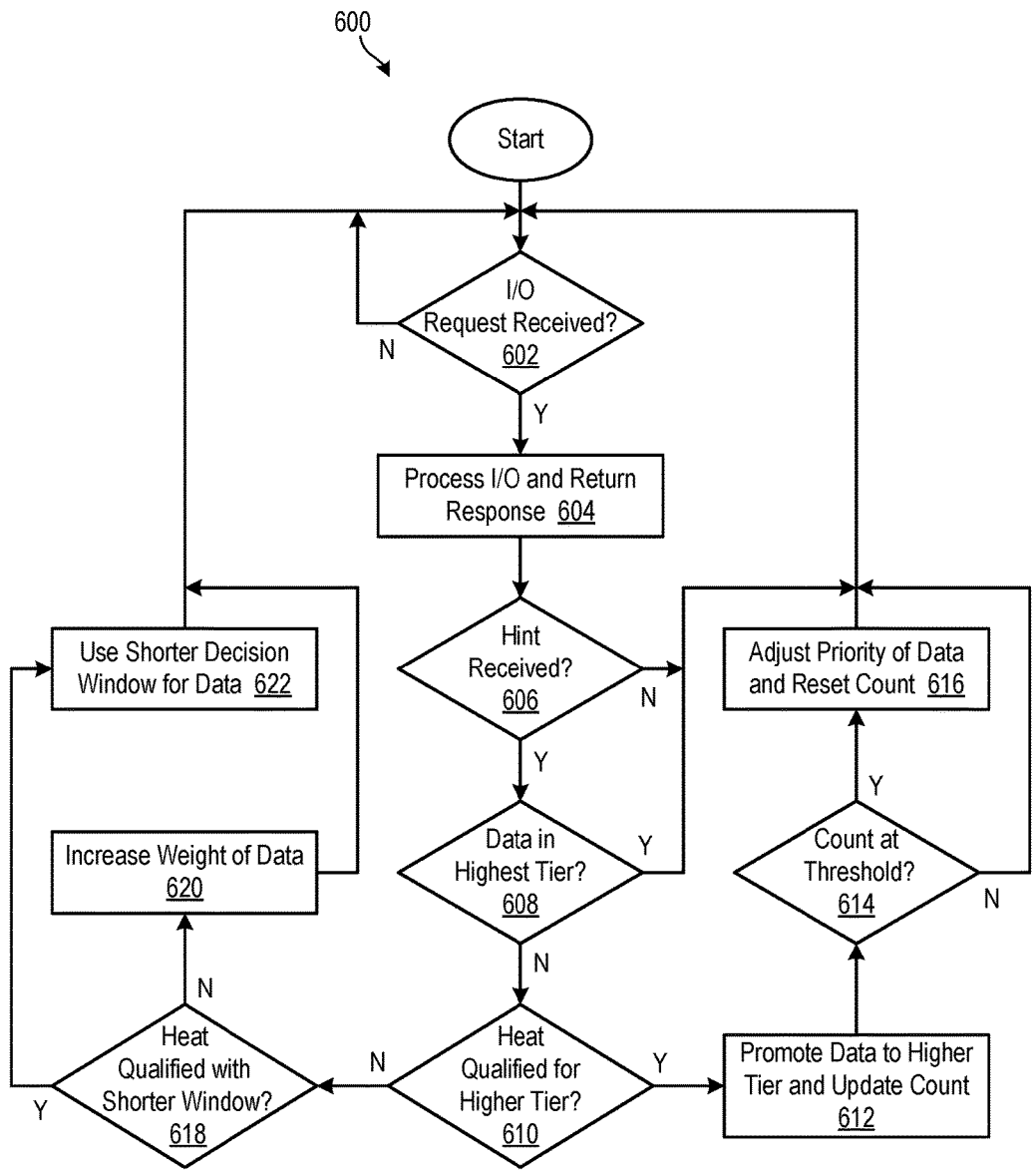
FIG. 6 is a process flow diagram showing one embodiment of a method that may be implemented at a storage system.

Referring to FIG. 6, one embodiment of a method 600 that may be implemented at the storage system 110 is illustrated. As shown, the storage system 110 initially determines 602 whether an I/O request 306 has been received. If so, the storage system 110 processes 604 the I/O request 306 and returns 604 a response 308 (e.g., data and/or completion status) to the host system 106 or application 300 that initiated the I/O request 306. The storage system 110 then determines 606 whether a hint 310 is received from the host system 106 or application 300 that indicates that I/O performance associated with the I/O request 306 is unacceptable. In not the method 600 ends (i.e., goes back to step 602).

If a hint 310 is received, the storage system 110 determines 608 whether data associated with the I/O request 306 is already in the highest storage tier. If so, the I/O performance of the data cannot be improved and the method 600 ends. If the data is not already in the highest storage tier, the storage system 110 determines 610 whether the temperature of the data qualifies it to be placed on a higher storage tier. If so, the storage system 110 promotes 612 the data to a higher storage tier. At this point, the storage system 110 may determine 614 whether the count associated with the particular data has reached a threshold. If not, the method 600 ends (i.e., goes back to step 602). If so, the storage system 110 adjusts 616 the priority of the particular data in a migration queue. This will ideally cause the particular data to be migrated to a higher storage tier sooner than it would be otherwise, with the goal of increasing I/O performance.

If, at step 610, the temperature of the particular data does not qualify it to be placed on a higher storage tier, the storage system 110 determines 618 whether a shorter decision window would change the temperature of the data sufficient to enable it to placed on a higher storage tier. If so, the storage system 110 uses 622 a shorter decision window (thereby causing it to be migrated to a higher storage tier) and the method 600 ends. If, at step 618, use of a shorter decision window would not change the temperature of the data sufficiently for it to be migrated to a higher storage tier, the storage system 110 increases 620 the weight of the data and the method 600 ends. This increase in weight will ideally cause the data to be migrated to a higher storage tier.

Figure 7:
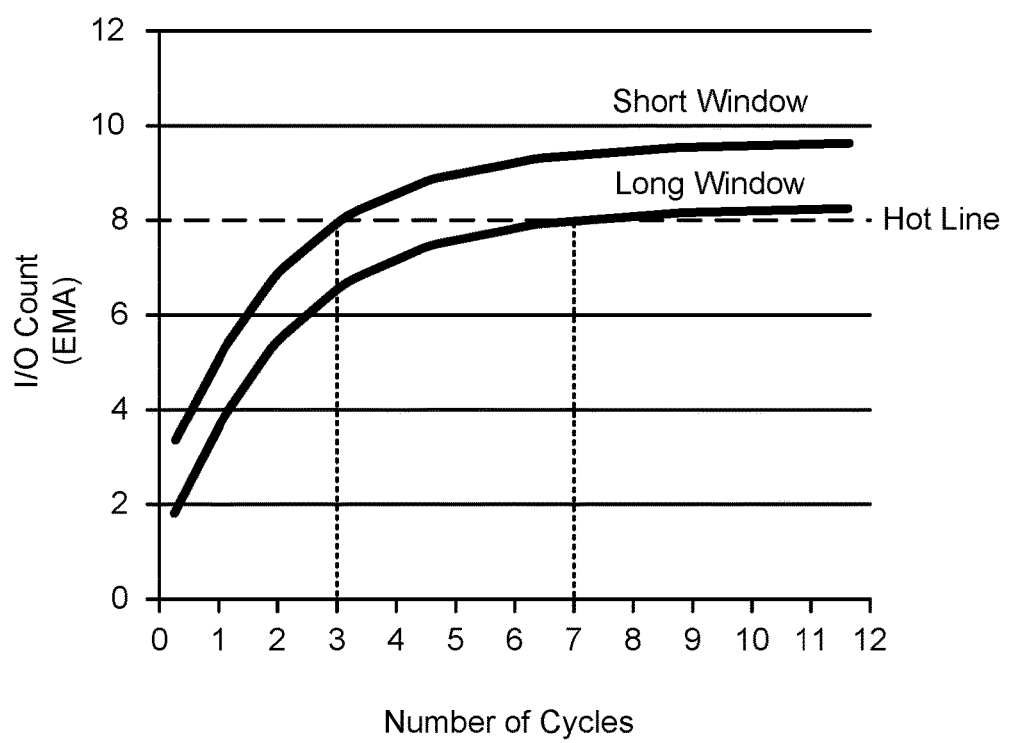
FIG. 7 is a graph showing how adjusting a decision window may be used to improve I/O performance associated with particular data.

Referring to FIG. 7, a graph showing how adjusting a decision window may be used to improve I/O performance associated with particular data is illustrated. In the illustrated example, assume that a particular data piece or element receives ten I/Os per cycle. Further assume that when the exponential moving average (EMA) of IOPs or response time of the data is eight or more, the data is considered hot and qualified to be moved to a higher storage tier. If the decision window is ten cycles, it takes about seven cycles for the EMA of the data to reach eight (as shown by the lower curve). By contrast, if the decision window is five cycles, it takes about three cycles for the EMA of the data to reach eight (as shown by the upper curve). Thus, with the shorter decision window, the data will be more quickly identified as hot and therefore benefit from being moved to a higher performing storage tier.

Referring to FIG. 8, a table showing how weight may be applied to particular data to improve its I/O performance is illustrated. FIG. 8 shows the EMA of three data elements ($D_0$, $D_1$, $D_2$, and $D_3$) before and after applying a weight. Row 1 shows the EMA values for each data element prior to applying a weight. As shown, the EMA for data elements $D_1$, $D_2$, and $D_3$ are greater than the EMA of data element $D_0$ prior to applying a weight. This would likely cause the data elements $D_1$, $D_2$, and $D_3$ to be moved to a higher storage tier prior to data element $D_0$. However, if a weight of three is applied to data element $D_0$ (as shown in row 2), this will cause its EMA to triple, thereby placing its final EMA value above the EMA values of data elements $D_1$, $D_2$, and $D_3$, as shown in row three. This will allow data element $D_0$ to be migrated to a higher storage tier before data elements $D_1$, $D_2$, and $D_3$. Applying a weight value to a data element may be appropriate in cases where the data is very important and could benefit from good I/O performance but may not be accessed that often or often enough to be migrated to a higher performance storage tier.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method to optimize data storage based on application feedback, the method comprising:
   receiving, by a storage system from an application, I/O requests associated with particular data residing on the storage system;
   processing, by the storage system, the I/O requests;
   receiving, by the storage system, feedback from the application indicating whether I/O performance associated with the I/O requests is acceptable; and
   in the event the I/O performance is not acceptable, iteratively adjusting, by the storage system in response to the feedback, an algorithm for placing the particular data on storage tiers of the storage system in an attempt to bring the I/O performance into conformance with expectations/requirements associated with the application.

2. The method of claim 1, wherein adjusting the algorithm comprises adjusting a decision window over which I/O activity to the particular data is measured.

3. The method of claim 2, wherein adjusting the decision window comprises shortening the decision window.

4. The method of claim 1, wherein adjusting the algorithm comprises adjusting a weight of the particular data.

5. The method of claim 4, wherein adjusting the weight of the particular data comprises multiplying each I/O to the particular data by a selected multiplier.

6. The method of claim 1, wherein adjusting the algorithm comprises adjusting a priority of the particular data within a migration queue.

7. The method of claim 1, wherein the particular data is a particular volume of data.

8. A computer program product to optimize data storage based on application feedback, the computer program product comprising a computer-readable storage medium having computer-usable program code embodied therein, the computer-usable program configured to perform the following when executed by at least one processor:
- receive, at a storage system from an application, I/O requests associated with particular data residing on the storage system;
- process, at the storage system, the I/O requests;
- receive, at the storage system, feedback from the application indicating whether I/O performance associated with the I/O requests is acceptable; and
- in the event the I/O performance is not acceptable, iteratively adjust, at the storage system in response to the feedback, an algorithm for placing the particular data on storage tiers of the storage system in an attempt to bring the I/O performance into conformance with expectations/requirements associated with the application.

9. The computer program product of claim 8, wherein adjusting the algorithm comprises adjusting a decision window over which I/O activity to the particular data is measured.

10. The computer program product of claim 9, wherein adjusting the decision window comprises shortening the decision window.

11. The computer program product of claim 8, wherein adjusting the algorithm comprises adjusting a weight of the particular data.

12. The computer program product of claim 11, wherein adjusting the weight of the particular data comprises multiplying each I/O to the particular data by a selected multiplier.

13. The computer program product of claim 8, wherein adjusting the algorithm comprises adjusting a priority of the particular data within a migration queue.

14. The computer program product of claim 8, wherein the particular data is a particular volume of data.

15. A system to optimize data storage based on application feedback, the system comprising:
- at least one processor;
- at least one memory device operably coupled to the at least one processor and storing instructions for execution on the at least one processor, the instructions causing the at least one processor to:
  - receive, at a storage system from an application, I/O requests associated with particular data residing on the storage system;
  - process, at the storage system, the I/O requests;
  - receive, at the storage system, feedback from the application indicating whether I/O performance associated with the I/O requests is acceptable; and
  - in the event the I/O performance is not acceptable, iteratively adjust, at the storage system in response to the feedback, an algorithm for placing the particular data on storage tiers of the storage system in an attempt to bring the I/O performance into conformance with expectations/requirements associated with the application.

16. The system of claim 15, wherein adjusting the algorithm comprises adjusting a decision window over which I/O activity to the particular data is measured.

17. The system of claim 16, wherein adjusting the decision window comprises shortening the decision window.

18. The system of claim 15, wherein adjusting the algorithm comprises adjusting a weight of the particular data.

19. The system of claim 18, wherein adjusting the weight of the particular data comprises multiplying each I/O to the particular data by a selected multiplier.

20. The system of claim 15, wherein adjusting the algorithm comprises adjusting a priority of the particular data within a migration queue.

* * * * *